US012700079B2

(12) United States Patent
Wang et al.

(10) Patent No.: US 12,700,079 B2
(45) Date of Patent: Aug. 4, 2026

(54) CROSS-SCALE DEFECT DETECTION METHOD BASED ON DEEP LEARNING

(71) Applicant: Nanjing University of Aeronautics and Astronautics, Nanjing (CN)

(72) Inventors: Jun Wang, Nanjing (CN); Zhongde Shan, Nanjing (CN); Li Dai, Nanjing (CN); Dawei Li, Nanjing (CN)

(73) Assignee: Nanjing University of Aeronautics and Astronautics, Nanjing City (CN)

( * ) Notice: Subject to any disclaimer, the term of this patent is extended or adjusted under 35 U.S.C. 154(b) by 319 days.

(21) Appl. No.: 18/321,527

(22) Filed: May 22, 2023

(65) Prior Publication Data

US 2023/0306577 A1 Sep. 28, 2023

(30) Foreign Application Priority Data

May 25, 2022 (CN) .......................... 202210571824.9

(51) Int. Cl.
G06T 7/00 (2017.01)
G06V 10/77 (2022.01)
(Continued)

(52) U.S. Cl.
CPC ........ G06T 7/0004 (2013.01); G06V 10/7715 (2022.01); G06V 10/806 (2022.01);
(Continued)

(58) Field of Classification Search
CPC ... G06T 2207/1008; G06T 2207/30108; G06T 2207/30136; G06T 7/0004;
(Continued)

(56) References Cited

U.S. PATENT DOCUMENTS 11,457,138 B2 * 9/2022 Huang ..................... G06T 7/521
11,514,660 B1 * 11/2022 Yang ...................... G06V 10/42
(Continued)

FOREIGN PATENT DOCUMENTS

CN 103295016 A * 9/2013
CN 108460403 A * 8/2018 ............. G06F 18/29
(Continued)

OTHER PUBLICATIONS

P. Lu, J. Jing and Y. Huang, "MRD-Net: An Effective CNN-Based Segmentation Network for Surface Defect Detection," in IEEE Transactions on Instrumentation and Measurement, vol. 71, pp. 1-12, 2022, Art No. 2516812, doi: 10.1109/TIM.2022.3200361. (Year: 2022).*
(Continued)

*Primary Examiner* — Michael Robert Cammarata

(57) ABSTRACT

A cross-scale defect detection method based on deep learning, including: (S1) building a vision data acquisition system to acquire a surface image of a part to be processed; and building a defect dataset; (S2) building a deep learning-based cross-scale defect detection model; and inputting the defect dataset obtained in the step (S1) into the deep learning-based cross-scale defect detection model for model training; and (S3) building a defect detection system according to the deep learning-based cross-scale defect detection model and the vision data acquisition system; and detecting a defect of the surface image of the part to be processed.

5 Claims, 3 Drawing Sheets

(51) Int. Cl.

*G06V 10/80* (2022.01)

*G06V 20/70* (2022.01)

(52) U.S. Cl.

CPC .... *G06V 20/70* (2022.01); *G06T 2207/10028* (2013.01); *G06T 2207/20081* (2013.01); *G06T 2207/30108* (2013.01)

(58) Field of Classification Search

CPC .......... G06T 2207/20081; G06T 2207/20084; G06N 3/04; G06N 3/08; G06V 10/7715; G06V 10/82

See application file for complete search history.

(56) References Cited

U.S. PATENT DOCUMENTS

| | | | |
|---|---|---|---|
| 12,260,630 B2 * | 3/2025 | Goyal | G06F 18/25 |
| 2020/0412940 A1 * | 12/2020 | Huang | G06V 10/82 |
| 2021/0174513 A1 * | 6/2021 | Chidlovskii | G06N 3/08 |
| 2022/0067950 A1 * | 3/2022 | Lv | G06N 3/08 |
| 2022/0253639 A1 * | 8/2022 | Fan | G06N 3/045 |

FOREIGN PATENT DOCUMENTS

| | | | | | |
|---|---|---|---|---|---|
| CN | 108921846 A | | 11/2018 | | |
| CN | 111415329 A | * | 7/2020 | | G06F 18/253 |
| CN | 111507998 A | * | 8/2020 | | G06N 3/045 |
| CN | 112434576 A | * | 3/2021 | | G06N 3/045 |
| CN | 113128559 A | | 7/2021 | | |
| CN | 113393434 A | * | 9/2021 | | G06F 18/214 |
| CN | 113947590 A | * | 1/2022 | | G06F 18/241 |
| CN | 114078204 A | * | 2/2022 | | G06N 3/045 |
| CN | 114170174 A | | 3/2022 | | |
| CN | 114266964 A | | 4/2022 | | |
| CN | 114332559 A | | 4/2022 | | |
| CN | 115471718 A | * | 12/2022 | | G06V 10/82 |
| CN | 119693794 A | * | 3/2025 | | |
| CN | 120339590 A | * | 7/2025 | | |
| WO | WO-2021088300 A1 | * | 5/2021 | | G06N 3/045 |

OTHER PUBLICATIONS

D. P. Fan, Z. Lin, Z. Zhang, M. Zhu, andM. M. Cheng, "RethinkingRGB-D salient object detection: Models, data sets, and large-scale benchmarks," IEEE Trans. Neural Netw. Learn. Syst., vol. 32, No. 5, pp. 2075-2089, May 2021. (Year: 2021).*

Shorten, Connor, and Taghi M. Khoshgoftaar. "A survey on image data augmentation for deep learning." Journal of big data 6.1 (2019): 1-48. (Year: 2019).*

Chen, Hao, Youfu Li, and Dan Su. "Multi-modal fusion network with multi-scale multi-path and cross-modal interactions for RGB-D salient object detection." Pattern Recognition 86 (2019): 376-385. (Year: 2019).*

J. Wang, K. Song, D. Zhang, M. Niu and Y. Yan, "Collaborative Learning Attention Network Based on RGB Image and Depth Image for Surface Defect Inspection of No-Service Rail," in IEEE/ASME Transactions on Mechatronics, vol. 27, No. 6, pp. 4874-4884, Dec. 2022, doi: 10.1109/TMECH.2022.3167412. (Year: 2022).*

Q. Zou, Z. Zhang, Q. Li, X. Qi, Q. Wang and S. Wang, "DeepCrack: Learning Hierarchical Convolutional Features for Crack Detection," in IEEE Transactions on Image Processing, vol. 28, No. 3, pp. 1498-1512, Mar. 2019, doi: 10.1109/TIP.2018.2878966. (Year: 2019).*

Jie Hu, Li Shen, Gang Sun; Proceedings of the IEEE Conference on Computer Vision and Pattern Recognition (CVPR), 2018, pp. 7132-7141 (Year: 2018).*

Gong Cheng et al., "Cross-Scale Feature Fusion for Object Detection in Optical Remote Sensing Images", IEEE Geoscience and Remote Sensing Letters, Mar. 4, 2020, Section II, pp. 1-5.

Jingpeng Wang et al., "Collaborative Learning Attention Network Based on RGB Image and Depth Image for Surface Defect Inspection of No-Service Rail", IEEE/ASME Transactions on Mechatronics, Dec. 2022, VOI.27, No. 6, pp. 1-11.

You Wu et al., "Automatic Fabric Defect Detection Using Cascaded Mixed Feature Pyramid with Guided Localization", sensors, 2020, vol. 20, No. 3, Section 3, pp. 1-17.

Hao Shuai et al., "YOLOv5 Transmission Line Fault Detection Based on Attention Mechanism and Cross-scale Feature Fusion", Proceedings of the Chinese Society for Electrical Engineering, Mar. 20, 2023, vol. 43, No. 6, pp. 2319-2330.

Zhiyuan Wu et al., "Research on Surface Defect Detection of notebook Panel based on RGB-D data", Equipment Manufacturing Technology, 2022, No. 2, pp. 21-24, 35.

* cited by examiner

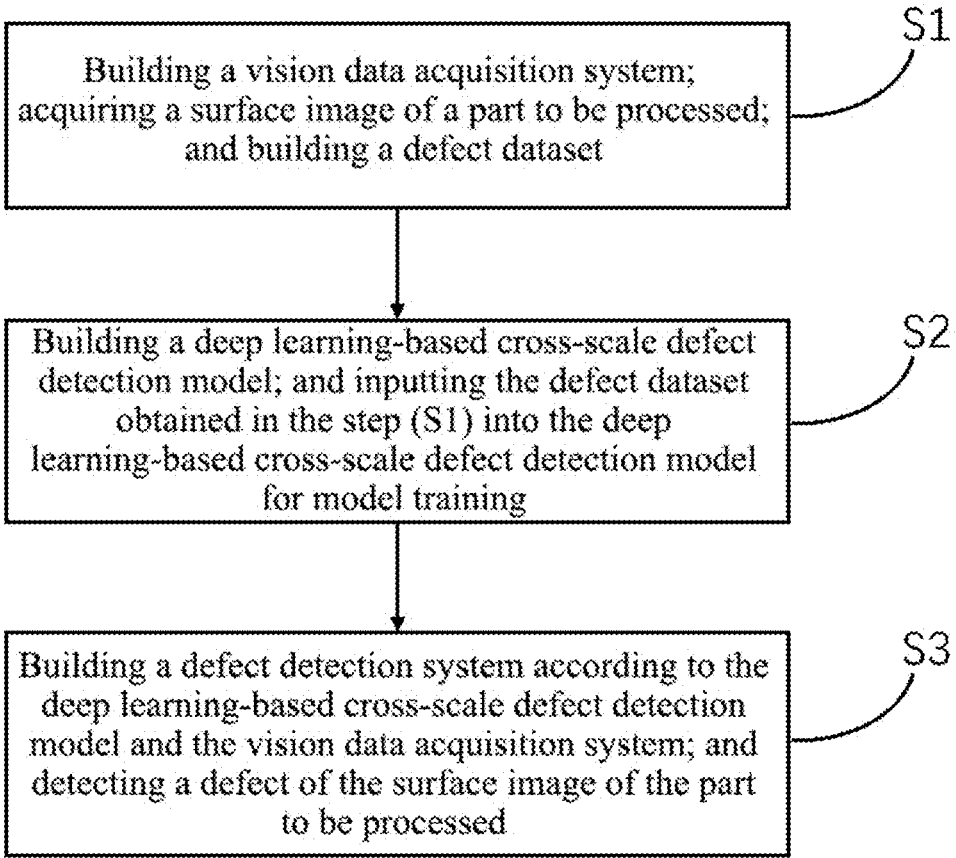

S1

Building a vision data acquisition system; acquiring a surface image of a part to be processed; and building a defect dataset

S2

Building a deep learning-based cross-scale defect detection model; and inputting the defect dataset obtained in the step (S1) into the deep learning-based cross-scale defect detection model for model training

S3

Building a defect detection system according to the deep learning-based cross-scale defect detection model and the vision data acquisition system; and detecting a defect of the surface image of the part to be processed

FIG. 1

CROSS-SCALE DEFECT DETECTION METHOD BASED ON DEEP LEARNING

CROSS-REFERENCE TO RELATED APPLICATIONS

This application claims the benefit of priority from Chinese Patent Application No. 202210571824.9, filed on May 25, 2022. The content of the aforementioned application, including any intervening amendments thereto, is incorporated herein by reference in its entirety.

TECHNICAL FIELD

This application relates to defect detection of parts of large equipment, and more particularity to a cross-scale defect detection method based on deep learning.

BACKGROUND

Large high-end equipment for aviation, aerospace and navigation plays an important role in national security and defense, and its quality directly affects the ultimate operational capability and international competitiveness. During the production and use processes, defects will inevitably occur on the surface of parts due to the deficiency in the production technology and fatigue. These defects are generally characterized by large scale, complex and diverse interior structure, and complex surface structure. Therefore, a key to ensure the quality of weapons and equipment and shorten the development and production cycle is to detect these abnormal defects efficiently and accurately.

At present, the defect detection is mainly performed by manual qualitative detection and traditional machine learning-based feature extraction.

(1) Regarding the first strategy, the human eye-based visual detection is not only unable to achieve the quantitative measurement, but also has large labor and time consumption, high missing rate, low efficiency and poor reliability. In addition, the manual visual detection struggles with serious missed detection for minor defects, failing to satisfy the actual quality requirement.

(2) With respect to the second approach, the task mainly includes image pre-processing, feature extraction and feature classifier design. However, this defect detection method relies excessively on artificially designed feature extraction and classification strategy, and requires a large number of experiments for parameter adjustment and threshold setting. Moreover, the precision is susceptible to external environment, leading to high error rates.

The deep learning has been gradually applied to the defect detection. Specifically, a classical convolutional neural network is employed for image processing to generate a feature map for defect detection. Nevertheless, the existing deep learning-based defect detection techniques are not suitable for the detection of surface defects of industrial products due to the large scale.

SUMMARY

In view of the defects of the prior art, the present disclosure provides a cross-scale defect detection method based on deep learning, which has high defect detection accuracy and efficiency for parts of the large equipment.

Technical solutions of the disclosure are described as follows.

This application provides a cross-scale defect detection method based on deep learning, comprising:

(S1) building a vision data acquisition system to acquire a surface image of a part to be processed; and constructing a defect dataset;

(S2) building a deep learning-based cross-scale defect detection model; and inputting the defect dataset obtained in step (S1) into the deep learning-based cross-scale defect detection model for model training; and (S3) building a defect detection system according to the deep learning-based cross-scale defect detection model and the vision data acquisition system; and detecting, by the defect detection system, a defect of the surface image of the part to be processed.

In some embodiments, step (S1) comprises:

(S11) acquiring, by a depth sensor; a depth image of the defect of the surface image of the part to be processed, and acquiring, by a vision sensor, the visible image of the defect of the surface image of the part to be processed, wherein the depth image of the defect and the visible image of the defect are constructed as a defect data group;

(S12) rotating, cutting, scaling and converting the depth image and the visible image acquired in step (S11) to increase data of the surface image of the part to be processed for training; and (S13) annotating, by means of LabelImg, the defect of the surface image of the part to be processed to obtain the defect dataset.

In some embodiments, the defect comprises a scratch and crack on a surface on the part to be processed, and a protrusion, dent and roughness of a fastener.

In some embodiments, in step (S2), the deep learning-based cross-scale defect detection model is operated through steps of:

(a) taking a defect data group comprising the depth image and the visible image as an input;

(b) extracting a feature of the depth image and a feature of the visible image by means of a bi-branch feature extraction network; and subjecting the feature of the depth image and the feature of the visible image respectively extracted by two branches of the bi-branch feature extraction network to weighted fusion through an attention mechanism; and (c) subjecting the feature of the depth image and the feature of the visible image after weighted fusion to cross-scale feature fusion to reduce a channel dimension of a feature map $F_{A2}$ of a first scale, a channel dimension of a feature map $F_{A3}$ of a second scale, a channel dimension of a feature map $F_{A4}$ of a third scale, a channel dimension of a feature map $F_{A5}$ of a fourth scale and a channel dimension of a feature map $F_{A6}$ acquired by a squeeze-and-excitation (SE) module from 256 to 64; obtaining, by using a 1×1 convolution, intermediate feature maps $F_{B2}$, $F_{B3}$, $F_{B4}$, $F_{B5}$ and $F_{B6}$; performing up-sampling and/or down-sampling the $F_{B2}$, $F_{B3}$, $F_{B4}$ and $F_{B5}$ followed by concatenating to obtain a 256-D feature map having the same spatial resolution to a corresponding scale; and concatenating the $F_{A4}$ with the 256-D feature map to achieve a cross-scale feature fusion of five scales, expressed as:

$$f = \sum_{n}^{N} sum\left(\sum_{i \in W, j \in H} F_n(x_i, y_j)\right) + F_{A4};$$

wherein (x, y) is a pixel point of $F_n$; sum indicates summation; N is the number of feature maps; W is an image width; and H is an image height.

In some embodiments, each of the two branches of the bi-branch feature extraction network comprises a mix convolution branch and a squeeze-and-excitation (SE) branch;

wherein the mix convolution is configured to fuse multi-scale local information by using different receptive fields according to a convolution kernel size and a group size;

the SE branch is configured to distinguish a significance between different feature layers; and deepen semantic extraction and decoding through residual skip connection;

the group size G determines the number of different types of convolution kernels for a single input tensor; and when G=1, mix convolution is equivalent to a normal depth convolution.

In some embodiments, a fusion equation of the attention mechanism is expressed as:

$$F = \sum_i^N \lambda_1 F_{di} + \lambda_2 F_{vi};$$

wherein $\lambda_1$ is a weight of the feature of the depth image; $\lambda_2$ is a weight of the feature of the visible image; N is the number of layers of a feature map; $F_{di}$ is an $i^{th}$-layer feature map of the depth image; and $F_{vi}$ is an $i^{th}$-layer feature map of the visible image.

In some embodiments, the step (S3) comprises:

building the defect detection system according to the deep learning-based cross-scale defect detection model and the vision data acquisition system; and outputting, by the defect detection system, defect detection results in real time and saving the defect detection results in a form comprising a defect image and a table comprising a defect location;

wherein the vision data acquisition system is configured to acquire data; and the deep learning-based cross-scale defect detection model is configured for defect detection and detection result output.

Compared to the prior art, this application has the following beneficial effects.

This application applies the deep learning technology to the cross-scale defect detection, allowing for an improved defect detection accuracy and efficiency. In addition, the feature extraction network provided herein is capable of extracting multi-scale features, which is highly applicable to the detection of defects of different scales.

BRIEF DESCRIPTION OF THE DRAWINGS

FIG. 1 is a flow chart of a cross-scale defect detection method based on deep learning according to an embodiment of the disclosure;

DETAILED DESCRIPTION OF EMBODIMENTS

The present disclosure will be described below in detail below with reference to the accompanying drawings and embodiments.

As shown in FIG. 1, a cross-scale defect detection method based on deep learning is provided, which is performed through the following steps.

(S1) A vision data acquisition system is built to acquire a surface image of a part to be processed. A defect dataset is constructed. The step (S1) includes the following steps.

(S11) A depth image of the defect of the surface image of the part to be processed is acquired by a depth sensor. A visible image of the defect of the surface image of the part to be processed is acquired by a vision sensor. Structural defects such as protrusion and dent can be greatly shown through the depth sensor. Defects such as scratch and paint-shedding can be greatly shown through the vision sensor. The depth image of the defect and the visible image of the defect are constructed as a defect data group.

(S12) The depth image and the visible image acquired in the step (S1) are rotated, cut, scaled and converted to increase data of the surface image of the part to be processed for training.

(S13) The defect of the surface image of the part to be processed is annotated by means of LabelImg to obtain the defect dataset.

In an embodiment, the defect includes a scratch and crack on a surface on the part to be processed, and a protrusion, dent, and roughness of a fastener.

(S2) A deep learning-based cross-scale defect detection model is built. The defect dataset constructed in the step (S1) is input into the deep learning-based cross-scale defect detection model for model training.

Figure 2:
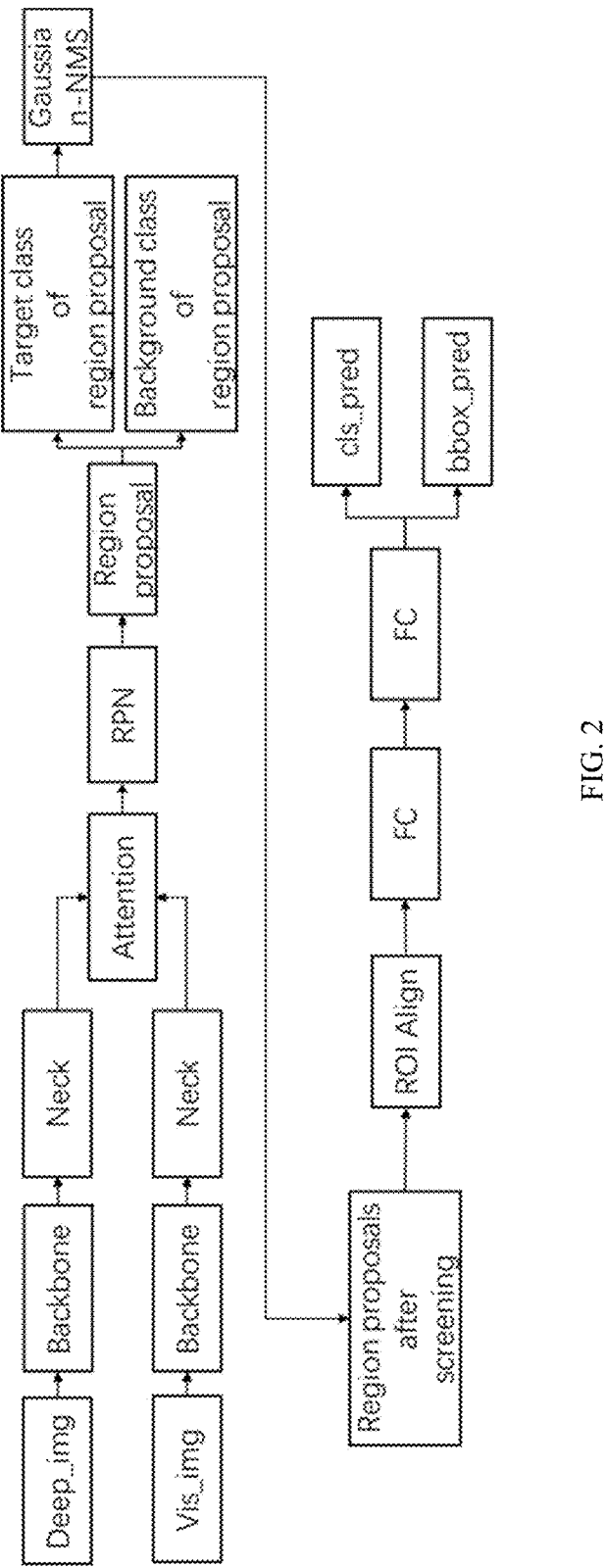
FIG. 2 schematically shows a deep learning-based cross-scale defect detection model according to an embodiment of the disclosure.

In an embodiment, as shown in FIG. 2, in the step (S2), the deep learning-based cross-scale defect detection model is operated through the following steps.

(a) A defect data group including the depth image and the visible image is taken as an input.

(b) A feature of the depth image and a feature of the visible image are extracted by means of a bi-branch feature extraction network of a backbone network of the deep learning-based cross-scale defect detection model. The feature of the depth image and the feature of the visible image respectively extracted by two branches of the bi-branch feature extraction network are subjected to weighted fusion through an attention mechanism.

The two branches of the bi-branch feature extraction network each include a mix convolution branch and a SE branch. The mix convolution is configured to fuse multi-scale local information by using different receptive fields according to a convolution kernel size and a group size. The SE branch is configured to distinguish a significance between different feature layers, and deepen semantic extraction and decoding through residual skip connection. The group size G determines the number of different types of convolution kernels for a single input tensor. When G=1, mix convolution is equivalent to a normal depth convolution.

A fusion equation of the attention mechanism is expressed as:

$$F = \sum_i^N \lambda_1 F_{di} + \lambda_2 F_{vi};$$

where $\lambda_1$ is a weight of the feature of the depth image; $\lambda_2$ is a weight of the feature of the visible image; N is the number of layers of a feature map; $F_{di}$ is an $i^{th}$-layer feature map of the depth image; and $F_{vi}$ is an $i^{th}$-layer feature map of the visible image.

Figure 3:
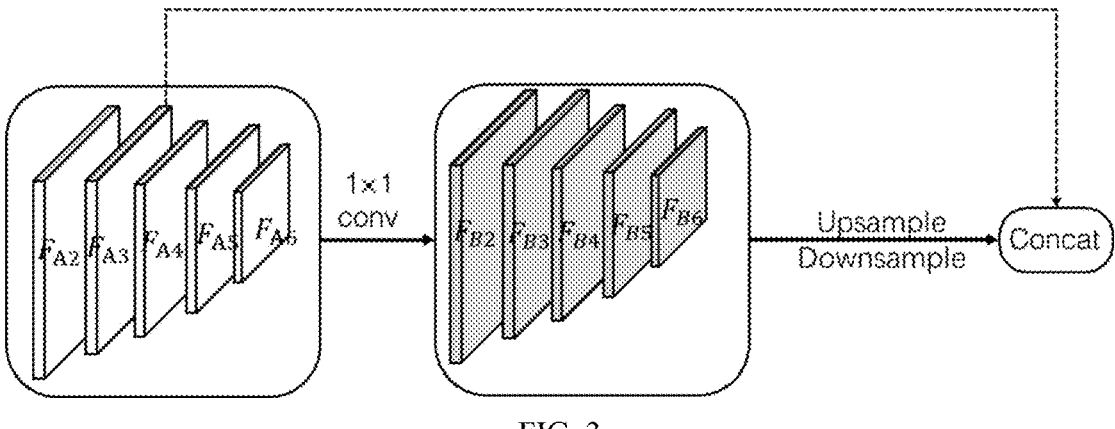
FIG. 3 schematically illustrates a cross-scale feature fusion network according to an embodiment of the disclosure.

(c) The feature of the depth image and the feature of the visible image after weighted fusion are subjected to cross-scale feature fusion as shown in FIG. 3 to reduce a channel dimension of a feature map $F_{A2}$ of a first scale, a channel dimension of a feature map $F_{A3}$ of a second scale, a channel dimension of a feature map $F_{A4}$ of a third scale, a channel dimension of a feature map $F_{A5}$ of a fourth scale and a channel dimension of a feature map $F_{A6}$ acquired by a SE module from 256 to 64. Intermediate feature maps $F_{B2}$, $F_{B3}$, $F_{B4}$, $F_{B5}$ and $F_{B6}$ are obtained by using a 1×1 convolution.

The $F_{B2}$, $F_{B3}$, $F_{B4}$ and $F_{B5}$ are subjected to up-sampling and/or down-sampling and concatenating to obtain a 256-D feature map having the same spatial resolution with a corresponding scale.

The $F_{A4}$ is superimposed onto the 256-D feature map to achieve a cross-scale feature fusion of five scales, expressed as:

$$f = \sum_{n}^{N} sum\left(\sum_{i \in W, j \in H} F_n(x_i, y_j)\right) + F_{A4};$$

where (x, y) is a pixel point of $F_n$; sum indicates summation; N is the number of the feature map; W is an image width; and H is an image height.

(S3) A defect detection system is built according to the deep learning-based cross-scale defect detection model and the vision data acquisition system. The defect of the surface image of the part to be processed is detected by the defect detection system to determine part quality and facilitate maintenance, so as to ensure the safety.

In an embodiment, the step (S3) includes the following steps.

The defect detection system is built according to the deep learning-based cross-scale defect detection model and the vision data acquisition system.

Defect detection results are output in real time by the defect detection system. The defect detection results are saved in a form including a defect image and a table including a defect location.

The vision data acquisition system is configured to acquire data; and the deep learning-based cross-scale defect detection model is configured for defect detection and detection result output.

Described above are merely preferred embodiments of the disclosure, which are illustrative and are not intended to limit the disclosure. It should be understood that any variations, modifications and replacements made by those skilled in the art without departing from the spirit of the disclosure should fall within the scope of the disclosure defined by the appended claims.

What is claimed is:

1. A cross-scale defect detection method based on deep learning, comprising:

(S1) building a vision data acquisition system to acquire a depth image and a visible image of a defect of a surface image of a part to be processed; and constructing a defect dataset;

(S2) building a deep learning-based cross-scale defect detection model; and inputting the defect dataset constructed in step (S1) into the deep learning-based cross-scale defect detection model for model training; and (S3) building a defect detection system according to the deep learning-based cross-scale defect detection model and the vision data acquisition system; and detecting, by the defect detection system, the defect of the surface image of the part to be processed;

wherein in step (S2), the deep learning-based cross-scale defect detection model is operated through steps of:

(a) taking a defect data group comprising the depth image and the visible image as an input;

(b) extracting a feature of the depth image and a feature of the visible image by means of a bi-branch feature extraction network; and subjecting the feature of the depth image and the feature of the visible image respectively extracted by two branches of the bi-branch feature extraction network to weighted fusion through an attention mechanism; and (c) subjecting the feature of the depth image and the feature of the visible image after weighted fusion to cross-scale feature fusion to reduce a channel dimension of a feature map $F_{A2}$ of a first scale, a channel dimension of a feature map $F_{A3}$ of a second scale, a channel dimension of a feature map $F_{A4}$ of a third scale, a channel dimension of a feature map $F_{A5}$ of a fourth scale and a channel dimension of a feature map $F_{A6}$ acquired by a squeeze-and-excitation (SE) module from 256 to 64; and obtaining intermediate feature maps $F_{B2}$, $F_{B3}$, $F_{B4}$, $F_{B5}$ and $F_{B6}$ by using a 1×1 convolution;

performing up-sampling and/or down-sampling on the $F_{B2}$, $F_{B3}$, $F_{B4}$ and $F_{B5}$ followed by concatenating to obtain a 256-D feature map having the same spatial resolution with a corresponding scale; and concatenating the $F_{A4}$ with the 256-D feature map to achieve a cross-scale feature fusion of five scales, expressed as:

$$f = \sum_{n}^{N} sum\left(\sum_{i \in W, j \in H} F_n(x_i, y_j)\right) + F_{A4};$$

wherein (x, y) is a pixel point of $F_n$; sum indicates summation; N is the number of feature maps; W is an image width; and H is an image height.

2. The cross-scale defect detection method of claim 1, wherein step (S1) comprises:

(S11) acquiring, by a depth sensor, the depth image of the defect of the surface image of the part to be processed, and acquiring, by a vision sensor, the visible image of the defect of the surface image of the part to be processed, wherein the depth image of the defect and the visible image of the defect are constructed as a defect data group;

(S12) rotating, cutting, scaling and converting the depth image and the visible image acquired in step (S11) to increase data of the surface image of the part to be processed for training; and (S13) annotating the defect of the surface image of the part to be processed by means of LabelImg to obtain the defect dataset.

3. The cross-scale defect detection method of claim 1, wherein each of the two branches of the bi-branch feature extraction network comprises a mix convolution branch and a squeeze-and-excitation (SE) branch;

wherein the mix convolution branch is configured to fuse multi-scale local information by using different receptive fields according to a convolution kernel size and a group size;

the SE branch is configured to distinguish a significance between different feature layers, and deepen semantic extraction and decoding through residual skip connection;

the group size G determines the number of different types of convolution kernels for a single input tensor; and when G=1, mix convolution is equivalent to a normal depth convolution.

4. The cross-scale defect detection method of claim 1, wherein a fusion equation of the attention mechanism is expressed as:

$$F = \sum_i^N \lambda_1 F_{di} + \lambda_2 F_{vi};$$

wherein $\lambda_1$ is a weight of the feature of the depth image; $\lambda_2$ is a weight of the feature of the visible image; N is the number of layers of a feature map; $F_{di}$ is an $i^{th}$-layer feature map of the depth image; and $F_{vi}$ is an $i^{th}$-layer feature map of the visible image.

5. The cross-scale defect detection method of claim 1, wherein the step (S3) comprises:

building the defect detection system according to the deep learning-based cross-scale defect detection model and the vision data acquisition system; and outputting, by the defect detection system, defect detection results in real time and saving the defect detection results in a form comprising a defect image and a table comprising a defect location;

wherein the vision data acquisition system is configured to acquire data; and the deep learning-based cross-scale defect detection model is configured for defect detection and detection result output.

\* \* \* \* \*